(12) United States Patent
McCoy et al.

(10) Patent No.: US 8,732,745 B2
(45) Date of Patent: May 20, 2014

(54) METHOD AND SYSTEM FOR INSERTING AN ADVERTISEMENT IN A MEDIA STREAM

(71) Applicants: Sony Corporation, Tokyo (JP); Sony Network Entertainment International LLC, Los Angeles, CA (US)

(72) Inventors: Charles McCoy, San Diego, CA (US); True Xiong, San Diego, CA (US); Ling Jun Wong, Champaign, IL (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 0 days.

(21) Appl. No.: 13/657,273

(22) Filed: Oct. 22, 2012

(65) Prior Publication Data
US 2014/0115625 A1    Apr. 24, 2014

(51) Int. Cl.
*H04N 7/10* (2006.01)
*H04N 7/025* (2006.01)

(52) U.S. Cl.
USPC .................. 725/32; 725/33; 725/34; 725/35; 725/36

(58) Field of Classification Search
None
See application file for complete search history.

(56) References Cited

U.S. PATENT DOCUMENTS

| | | | |
|---|---|---|---|
| 6,505,169 B1 | 1/2003 | Bhagavath et al. | |
| 2007/0157228 A1* | 7/2007 | Bayer et al. | 725/34 |
| 2009/0013347 A1* | 1/2009 | Ahanger et al. | 725/36 |
| 2009/0217316 A1 | 8/2009 | Gupta | |
| 2009/0271819 A1 | 10/2009 | Cansler et al. | |
| 2009/0307722 A1* | 12/2009 | Gross | 725/34 |
| 2011/0061073 A1* | 3/2011 | Nicholson et al. | 725/34 |
| 2013/0086601 A1* | 4/2013 | Adimatyam et al. | 725/1 |

OTHER PUBLICATIONS

Peggy Van Der Kreeft, et al., Requirements and Concepts for Content Casting, Context Casting (C-CAST) project deliverable D8, Nov. 2008, p. 1-p. 35, Instituto de Telecomunicações; Portugal.

* cited by examiner

*Primary Examiner* — Justin Shepard
(74) *Attorney, Agent, or Firm* — Sony Corporationi

(57) ABSTRACT

Certain aspects of a system and method for inserting an advertisement in a media stream may include a content access server. The content access server may receive the media stream from one or more content providers. The media stream may comprise one or more pre-determined positions for inserting the advertisement. The content access server may insert the advertisement in the media stream at one of the one or more pre-determined positions. The advertisement is selected from one or more advertisements in real-time based on a first metadata associated with the media stream, a location of the one or more pre-determined positions in the media stream, and one or more parameters associated with a user.

17 Claims, 5 Drawing Sheets

METHOD AND SYSTEM FOR INSERTING AN ADVERTISEMENT IN A MEDIA STREAM

CROSS-REFERENCE TO RELATED APPLICATIONS/INCORPORATION BY REFERENCE

None.

FIELD

Certain embodiments of the disclosure relate to a communication system. More specifically, certain embodiments of the disclosure relate to a method and system for inserting an advertisement in a media stream.

BACKGROUND

Advancements in communication technologies have enabled users to access a large number and variety of media content through the Internet. Media content providers rely on advertisements associated with their content as a source of revenue. However, sometimes the content providers may not have resources and/or experience for directly selling advertising spaces in their content to advertisers.

Further limitations and disadvantages of conventional and traditional approaches will become apparent to one of skill in the art, through comparison of such systems with some aspects of the present disclosure as set forth in the remainder of the present application with reference to the drawings.

SUMMARY

A system and/or method is provided for inserting an advertisement in a media stream substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
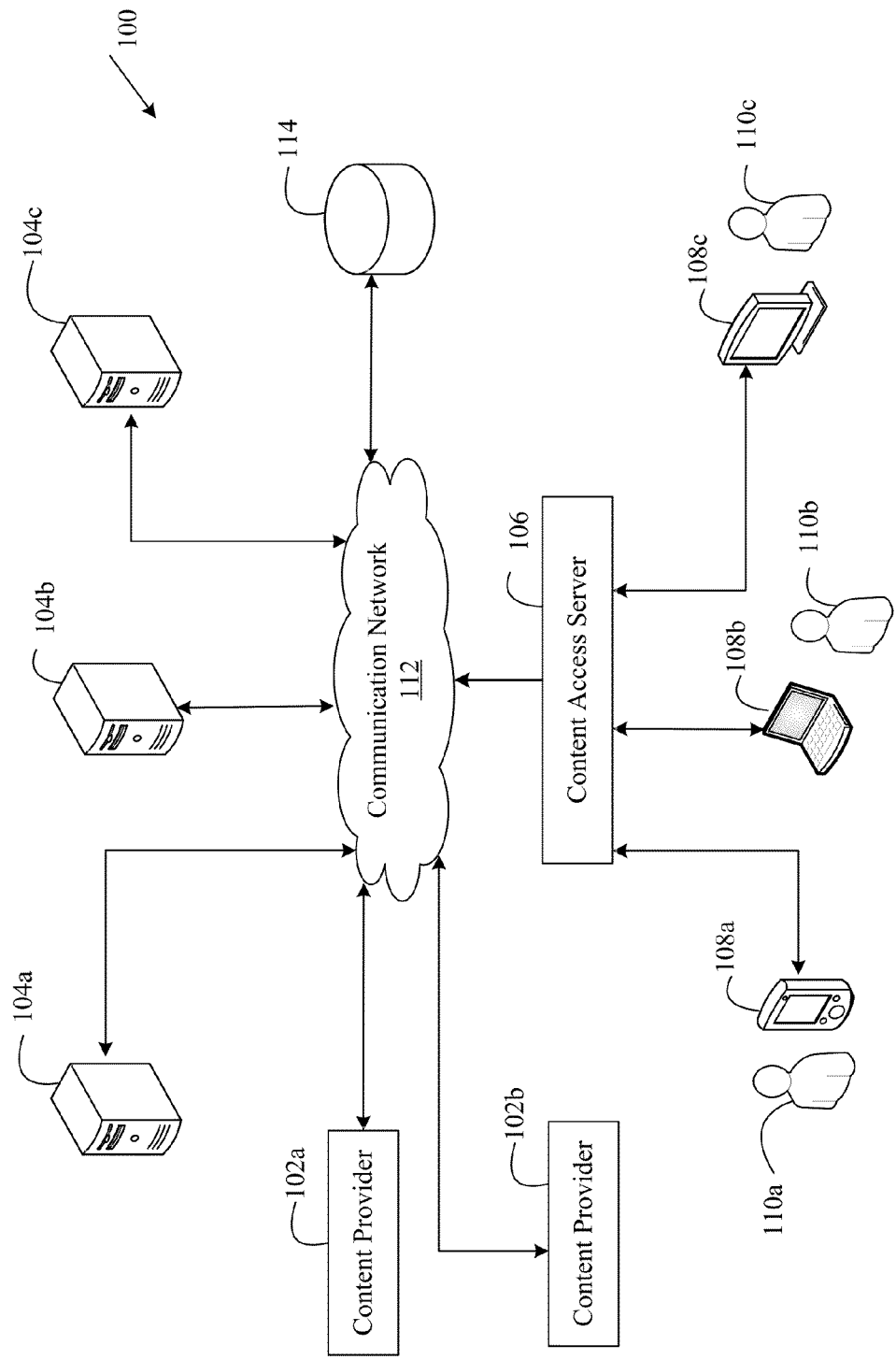
FIG. 1 is a block diagram illustrating inserting an advertisement in a media stream in an exemplary network, in accordance with an embodiment of the disclosure.

Certain implementations may be found in a system and/or method for inserting an advertisement in a media stream.

Exemplary aspects of the disclosure may comprise a content access server. The content access server may receive the media stream from one or more content providers. The media stream may comprise one or more pre-determined positions for inserting the advertisement. The content access server may insert the advertisement in the media stream at one of the one or more pre-determined positions. The advertisement is selected from one or more advertisements in real-time based on a first metadata associated with the media stream, a location of the one or more pre-determined positions in the media stream, and one or more parameters associated with a user.

The one or more pre-determined positions in the media stream may be defined by the one or more content providers. The one or more pre-determined positions in the media stream may be defined by a third party server. The content access server may receive the one or more advertisements from one or more advertising servers. One or both of at least a portion of the received media stream and/or the received one or more advertisements may be stored locally at the content access server.

The content access server may receive second metadata associated with the one or more pre-determined positions from the one or more content providers. The second metadata may comprise one or more of a type of the advertisement, a minimum duration of the advertisement, a maximum duration of the advertisement, a time to start the advertisement, a length of the advertisement, and/or one or more tags and/or keywords indicating context for the advertisement.

The content access server may select the advertisement from the one or more advertisements in real-time based on the second metadata. The content access server may transmit the media stream along with the advertisement to a user device associated with the user. The content access server may receive from the user device a log of one or more user activities associated with the advertisement. The one or more user activities may comprise one or more of viewing the advertisement, skipping the advertisement, responding to the advertisement, and/or replaying the advertisement. The content access server may select the advertisement from the one or more advertisements in real-time based on the one or more user activities. The one or more parameters may comprise one or more of user's profile, type of content of media stream played by the user, user's location, user's subscription details, user's billing information, one or more products purchased by the user, time spent by the user on playing the media stream, one or more settings of the user device, one or more user preferences, time at which the user plays the media stream, information associated with another user device associated with the user, a user category associated with the user, and/or user's demographic profile.

The first metadata may comprise one or more of viewership of the media stream, a time of transmission of the media stream, a duration of the media stream, a location where the media stream is played, and/or information related to content of the media stream. The content access server may delay transmission of a live broadcast of the media stream when playback of the live broadcast of the media stream may start prior to completion of playback of a first advertisement. The content access server may reduce duration of playback of a second advertisement when playback of the live broadcast of the media stream starts prior to completion of the playback of the first advertisement. A position of the second advertisement in the live broadcast of the media stream may be subsequent to a position of the first advertisement in the live broadcast of the media stream.

Exemplary aspects of the disclosure may comprise a content access server. The content access server may determine one or more positions in the media stream for inserting the advertisement. The one or more positions in the media stream may be determined in real-time based on content of the media stream. The content access server may select the advertisement from one or more advertisements in real-time based on a first metadata associated with the media stream, a location of the one or more determined positions in the media stream, and one or more parameters associated with a user. The content access server may insert the advertisement in the media stream at one of the one or more determined positions. The content access server may analyze the media stream to determine the content of the media stream.

FIG. 1 is a block diagram illustrating inserting an advertisement in a media stream in an exemplary network, in accordance with an embodiment of the disclosure. Referring to FIG. 1, there is shown a network 100. The network 100 may comprise a first content provider 102a and a second content provider 102b (hereinafter referred to collectively as content providers 102), a first advertising server 104a, a second advertising server 104b, and a third advertising server 104c (hereinafter referred to collectively as advertising servers 104), a content access server 106, one or more user devices, such as, a mobile device 108a, a laptop 108b, and a television 108c (hereinafter referred to collectively as user devices 108), a first user 110a, a second user 110b, and a third user 110c (hereinafter referred to collectively as users 110), a communication network 112, and a database 114. The users 110 may be associated with the user devices 108 in a variety of ways. For example, the first user 110a may be associated with the mobile device 108a, the second user 110b may be associated with the laptop 108b, and the third user 110c may be associated with the television 108c.

The content providers 102, the advertising servers 104, the content access server 106, and the user devices 108 may be operable to communicate with each other via the communication network 112. The content providers 102, the advertising servers 104, the content access server 106, and the user devices 108 may be operable to connect to the communication network 112, in accordance with various wired and wireless communication protocols, such as Transmission Control Protocol and Internet Protocol (TCP/IP), User Datagram Protocol (UDP), Hypertext Transfer Protocol (HTTP), and/or File Transfer Protocol (FTP). Examples of the communication network 112 may include, but are not limited to, the Internet, an IPTV network, a Plain Old Telephone Service (POTS), a Wireless Fidelity (Wi-Fi) network, a Wireless Local Area Network (WLAN), a Local Area Network (LAN), and/or a Metropolitan Area Network (MAN).

The content providers 102 may comprise suitable logic, circuitry, interfaces, and/or code that may be operable to provide a media stream for use by the user devices 108. The media stream may correspond to a continuous sequence of audio, video, text, image, animation, and/or a combination thereof. The media stream may include content such as news, information and entertainment, leisure activities, and/or the like. In an embodiment, the content providers 102 may be associated with an organization and/or an individual that may create the media stream. In an embodiment, the organization and/or the individual associated with the content providers 102 may define one or more pre-determined positions in the media stream where advertisements may be inserted. In an embodiment, the content providers 102 may utilize one or more media editing tools to add one or more tags in the media stream. The one or more tags may indicate the one or more pre-determined positions for inserting the advertisements. In another embodiment, the content providers 102 may insert one or more cues in the media stream. For example, the inserted cue may be "We'll be right back after these commercials". The one or more inserted cues may indicate the one or more pre-determined positions for inserting the advertisements. Notwithstanding, the disclosure may not be so limited and the content providers 102 may define the one or more pre-determined positions for inserting the advertisements using any method without limiting the scope of the disclosure.

The content providers 102 may include a storage device, and/or multiple storage devices distributively connected, that maintain a repository of the media stream provided by the content providers 102. The content providers 102 may transmit the media stream to the content access server 106 via the communication network 112. Examples of the content providers 102 may include, but are not limited to, television networks, on-demand content providers, and/or independent content provider companies.

The advertising servers 104 may comprise suitable logic, circuitry, interfaces, and/or code that may be operable to provide the one or more advertisements to the content access server 106. The advertising servers 104 may be implemented as a cluster and/or a network of computing devices that jointly perform the functions of the advertising servers 104.

The content access server 106 may comprise suitable logic, circuitry, interfaces, and/or code that may be operable to transmit the media stream received from the content providers 102 to the user devices 108. In an embodiment, the content access server 106 may be operable to combine the media streams received from the one or more content providers, such as, the first content provider 102a and/or the second content provider 102b, and may transmit the combined media stream to the user devices 108. The content access server 106 may transmit the media stream to the user devices 108, in accordance with various digital transmission protocols such as Digital Terrestrial Television (DTV) and/or Internet Protocol Television (IPTV). In an embodiment, the content access server 106 may be an IPTV service provider that may have rights to transmit the media stream to the user devices 108. In an embodiment, the content access server 106 may provide access to the Internet to the user devices 108. The content access server 106 may communicate with the content providers 102, the advertising servers 104, and the user devices 108 via the communication network 112.

In an embodiment, the content access server 106 may be operable to determine one or more pre-determined positions in the media stream suitable for inserting one or more advertisements. In an embodiment, the content access server 106 may determine the one or more pre-determined positions based on one or more of content of the media stream and frame level analysis of the media stream. In an embodiment, the content access server 106 may be operable to insert an advertisement in the media stream. Inserting the advertisement in the media stream is described below, in detail, in conjunction with FIG. 2, and FIG. 3. In an embodiment, the content access server 106 may be operable to receive one or more advertisements for insertion from the advertising servers 104. In another embodiment, the content access server 106 may be operable to insert one or more advertisements stored locally in the content access server 106.

In an embodiment, the one or more pre-determined positions for insertion of advertisements may be defined by a third party server associated with a firm that specializes in determining advertisement placement in media produced by others. The content access server 106 may communicate with a third party server through the communication network 112.

The content access server 106 may be implemented as a cluster or network of computing devices configured to jointly perform the functions of the content access server 106. The content access server 106 may optionally include storage mediums for storing the media stream, the one or more advertisements, data related to the user devices 108, data related to the advertising servers 104, and/or any other data. The content access server 106 is described below, in detail, in conjunction with FIG. 2.

The user devices 108 may comprise suitable logic, circuitry, interfaces, and/or code that may be operable to receive and play a media stream. In an embodiment, the user devices 108 may be operable to convert the received media stream in a format that the user devices 108 may playback. Examples of the user devices 108 may include, but are not limited to, mobile phones, laptops, tablet computers, televisions, Personal Digital Assistant (PDA) devices, and/or any other device having hardware and software components to play the media stream.

The user devices 108 may comprise various input and output devices. The users 110 may provide an input using the input devices. Examples of such input devices may include, but are not limited to, a keyboard, a mouse, a joystick, a stylus, a track pad, a touch screen, a microphone, and/or a camera.

Examples of the output devices may include, but are not limited to, a display screen and/or a speaker. The display screen may be operable to display a user interface associated with the user devices 108. The user interface may provide the users 110 one or more options to define the user preference. The user interface may provide the users 110 one or more options to perform one or more user activities on the user devices 108. The user interface may provide the users 110 one or more options to specify settings of the user devices 108. Such settings may include volume control, color setting, display format, language setting, and/or the like. The users 110 may select the one or more options using the input devices.

The database 114 may comprise suitable logic, circuitry, interfaces, and/or code that may be operable to store the media stream, the one or more advertisements, data related to the user devices 108, data related to the advertising servers 104, and/or any other data. In an embodiment, the database 114 may be connected to the content access server 106 via the communication network 112. In another embodiment, the database 114 may be integrated with the content access server 106. The database 114 may be implemented by using several technologies that are well known to those skilled in the art. Some examples of technologies may include, but are not limited to, MySQL® and Microsoft SQL®.

In operation, the content access server 106 may receive the media stream from the content providers 102 via the communication network 112. In an embodiment, the received media stream may include one or more pre-determined positions for inserting advertisements. In another embodiment, the content access server 106 may determine one or more pre-determined positions for inserting advertisements. The content access server 106 may select in real-time an advertisement from the one or more advertisements for insertion at one of the one or more pre-determined positions. Selecting the advertisement is described below, in detail, in conjunction with FIG. 2. The content access server 106 may insert the advertisement in the media stream at one of the one or more pre-determined positions. The content access server 106 may transmit the media stream along with the inserted advertisement to the user devices 108. The user devices 108 may playback the media stream received from the content access server 106.

Figure 2:
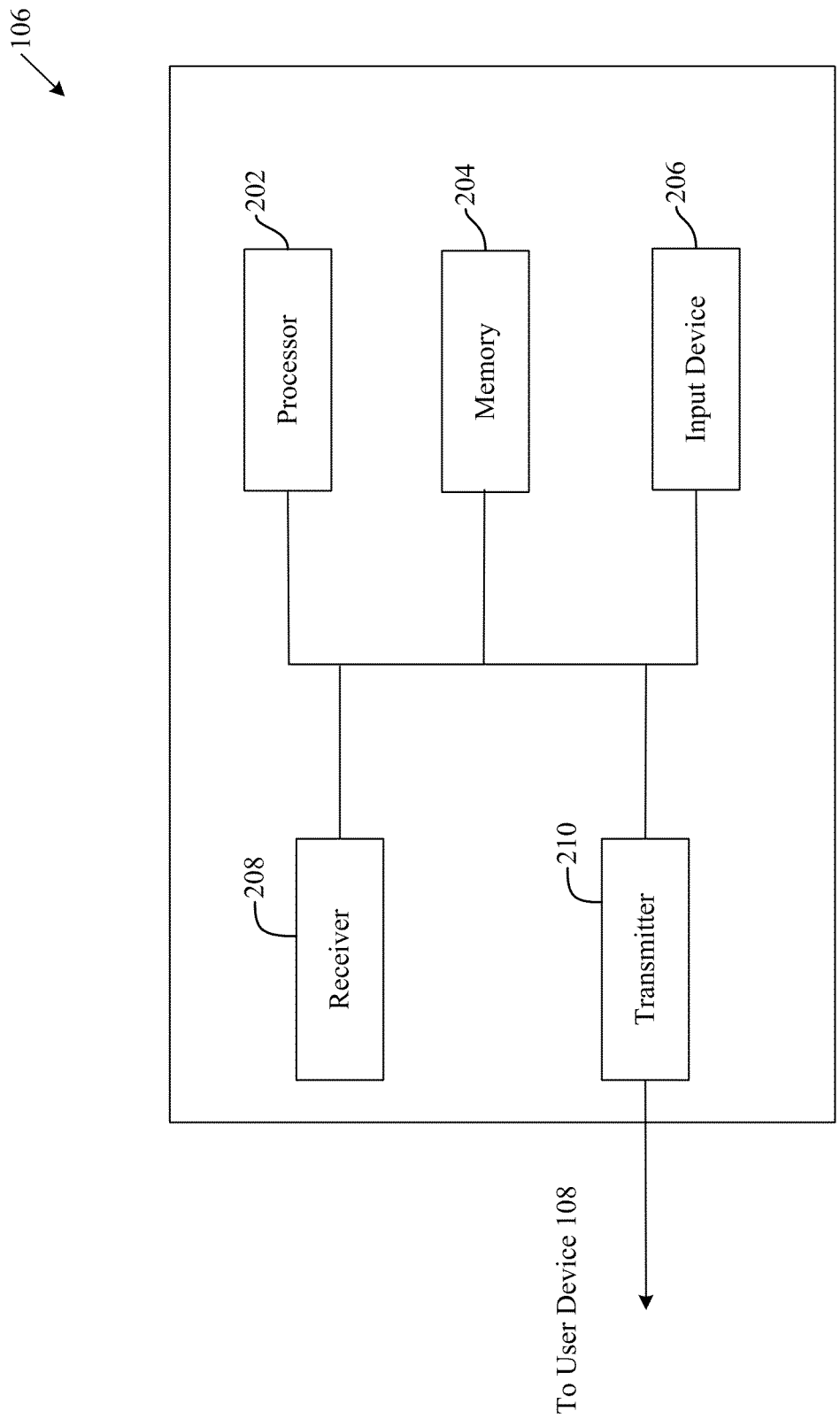
FIG. 2 is a block diagram of an exemplary content access server, in accordance with an embodiment of the disclosure.

FIG. 2 is a block diagram of an exemplary content access server, in accordance with an embodiment of the disclosure. The block diagram of the exemplary content access server is described in conjunction with the block diagram of FIG. 1.

Referring to FIG. 2, there is shown the content access server 106. The content access server 106 may comprise one or more processors, such as a processor 202, a memory 204, an input device 206, a receiver 208, and a transmitter 210.

The processor 202 may be communicatively coupled to the memory 204 and the input device 206. Further, the receiver 208 and the transmitter 210 may be communicatively coupled to the processor 202, the memory 204, and the input device 206.

The processor 202 may comprise suitable logic, circuitry, and/or interfaces that may be operable to execute at least one code section stored in the memory 204. The processor 202 may be implemented based on a number of processor technologies known in the art. Examples of the processor 202 may include, but are not limited to, an X86-based processor, a RISC processor, an ASIC processor, and/or a CISC processor.

The memory 204 may comprise suitable logic, circuitry, interfaces, and/or code that may be operable to store a machine code and/or a computer program having the at least one code section executable by the processor 202. The memory 204 may further be operable to store data, such as the media stream, one or more advertisements, data related to the user devices 108, data related to the advertising servers 104, first metadata associated with the media stream, one or more parameters associated with the users 110, second metadata associated with the one or more pre-determined positions, and/or any other data. Examples of implementation of the memory 204 may include, but are not limited to, Random Access Memory (RAM), Read Only Memory (ROM), Hard Disk Drive (HDD), and/or a Secure Digital (SD) card.

The input device 206 may comprise suitable logic, circuitry, interfaces, and/or code that may be operable to receive input from an administrator associated with the content access server 106. Examples of the input device 206 may include, but are not limited to, a keypad, a stylus, and/or a touch screen.

The receiver 208 may comprise suitable logic, circuitry, interfaces, and/or code that may be operable to receive data and messages. The receiver 208 may receive data in accordance with various known communication protocols. In an embodiment, the receiver 208 may receive the media stream from the content providers 102. In another embodiment, the receiver 208 may receive the one or more advertisements from the advertising servers 104. In another embodiment, the receiver 208 may receive the second metadata associated with the one or more pre-determined positions from the content providers 102. The receiver 208 may implement known technologies for supporting wired or wireless communication with the communication network 112.

The transmitter 210 may comprise suitable logic, circuitry, interfaces, and/or code that may be operable to transmit data and/or messages. The transmitter 210 may transmit data in accordance with various known communication protocols. In an embodiment, the transmitter 210 may transmit the media stream along with the inserted advertisement to the user devices 108.

In operation, the receiver 208 may receive the media stream from the content providers 102. In an embodiment, the received media stream may include one or more pre-determined positions for inserting advertisements. In another embodiment, the processor 202 may determine one or more pre-determined positions for inserting advertisements. The processor 202 may select an advertisement for insertion at one of the one or more pre-determined positions from the one or more advertisements. The processor 202 may select the advertisement based on a first metadata associated with the media stream, a location of the one or more pre-determined positions in the media stream, and one or more parameters associated with the users 110. The processor 202 may insert the selected advertisement in the media stream at one of the one or more pre-determined positions. The processor 202 may transmit the media stream along with the inserted advertisement to the user devices 108 via the transmitter 210.

In an embodiment, the processor 202 may analyze the media stream received from the content provider to identify the one or more pre-determined positions in the media stream. In an embodiment, the received media stream may not include the one or more pre-determined positions. The processor 202 may determine the one or more pre-determined positions for inserting advertisements. The processor 202 may derive a media stream having the one or more pre-determined positions from the media stream that do not include the one or more pre-determined positions. The processor 202 may determine the one or more pre-determined positions based on one or more of content of the media stream and/or frame level analysis of the media stream. The processor 202 may use image processing and/or video processing techniques and/or software to determine content of the media stream. For example, the processor 202 may analyze a media stream, such as a video, to determine the cuts between shots. The processor 202 may determine that two shots which may be close in time and have similar appearance may indicate that they are part of the same scene. The processor 202 may determine that the pre-determined positions for inserting the advertisements may not be positioned between the shots of a same scene. The processor 202 may determine two shots, which may indicate a change in scene and may insert advertisements at positions where the scene may change. The processor 202 may determine that the shots with bigger discontinuity may be appropriate for inserting advertisements between them. In another example, the processor 202 may determine that the video includes a series of shots with a lot of action followed by a series of shots with less action. The processor 202 may determine that the one or more pre-determined positions for insertion of one or more advertisements may be positioned before or after the series of shots with a lot of action. In another example, the processor 202 may determine that the one or more pre-determined positions for insertion of advertisements may be at time instants at which a media stream switches to another media stream.

In an embodiment, the processor 202 may register the users 110 and/or the associated user devices 108 with the content access server 106 during a one-time sign-up process. The processor 202 may assign a login name and a password to the users 110 after a successful registration. The users 110 may connect with the content access server 106 using the login name and the password. The processor 202 may also assign a unique identification number to the user devices 108 and/or the users 110. The processor 202 may identify the user devices 108 and/or the users 110 via other means such as, but not limited to, Media Access Control (MAC) address, IP address, biometric identification including facial recognition, Radio-Frequency Identification (RFID) cards, credit card details, user's name, address and/or via any other identifiers unique to the users 110, and/or combinations of the foregoing.

In an embodiment, the processor 202 may be operable to maintain a user profile corresponding to each of the first user 110*a*, the second user 110*b*, and the third user 110*c*. The user profile may include information such as, but not limited to, the user's name, occupation, age, gender, education, hobbies, interests, marital status, and/or geographic location. Such user profiles can be stored either locally in the memory 204 of the content access server 106 or in the database 114 communicatively coupled to the content access server 106. The processor 202 may select the advertisement for insertion at one of the one or more pre-determined positions in the media stream based on the user profile of the users 110.

In an embodiment, the processor 202 may be operable to provide one or more service options to the users 110. The service options may enable the users 110 to select the type of services required. Examples of such services may be a subscription-based service, a pay-per-view service, an on-demand service, and/or the like. Each service may have an associated cost. For example, the content access server 106 may bill the users 110 periodically (for example, monthly) for the subscription-based service. For other types of services, such as the pay-per-view service, the content access server 106 may bill the users 110 based on usage of the service. In an embodiment, the processor 202 may categorize the users 110 into one or more user categories based on the type of services selected by the users 110 and/or the billing information of the users 110. Examples of such user categories may include, but are not limited to, a premium user category, a standard user category, and/or the like.

The processor 202 may select a type and/or a number of advertisements for insertion in the media stream based on the user category associated with the users 110. For example, the processor 202 may insert a lesser number of advertisements in the media stream for transmission to the users 110 of the premium user category as compared to number of advertisements inserted in the media stream for transmission to the users 110 of the standard user category.

In another embodiment, the processor 202 may select an advertisement for insertion at one of the one or more pre-determined positions in the media stream based on the one or more parameters associated with the users 110. The one or more parameters may comprise one or more of a user's profile, a type of content of media stream played by the users 110, a user's location, a user's subscription details, a user's billing information, one or more products purchased by the users 110, time spent by the users 110 on playing the media stream, one or more settings of the user devices 108, one or more user preferences, time at which the users 110 play the media stream, information associated with another user device associated with the users 110, a user category associated with the users 110, and/or a user's demographic profile.

In an embodiment, the receiver 208 may receive the first metadata associated with the media stream from the content providers 102. In an embodiment, the receiver 208 may receive the first metadata as a header within the media stream. In another embodiment, the receiver 208 may receive the first metadata as a separate file along with the media stream. The first metadata may comprise one or more of viewership of the media stream, a time of transmission of the media stream, a duration of the media stream, a location where the media stream may be played, and/or information related to content of the media stream. Such information related to the content may be a title of the content, one or more keywords related to the content, information about characters shown in the content, and/or the like. The processor 202 may store the received media stream and the first metadata locally in the memory 204 of the content access server 106 and/or in the database 114.

In an embodiment, the content access server 106 may be operable to receive the one or more advertisements from the advertising servers 104 via the receiver 208. In an embodiment, the content access server 106 may receive the one or more advertisements from the advertising servers 104 that are selected based on an auction mechanism. According to the auction mechanism, the one or more advertising servers, such as the first advertising server 104*a* and the second advertising server 104*b*, may bid to provide the one or more advertisements to the content access server 106. The processor 202 may select the one or more advertising servers based on the bid. Notwithstanding, the disclosure may not be so limited and any method may be used for selecting an advertising server without limiting the scope of the disclosure. In an embodiment, the processor 202 may store the received one or more advertisements either locally in the memory 204 of the content access server 106 and/or in the database 114 communicatively coupled to the content access server 106. In an embodiment, a third metadata may be associated with each of the one or more advertisements. The third metadata may include, but are not limited to, type of a product and/or a service advertised, a duration of the advertisement, an advertisement format, advertisement media types, an intended audience, and/or pricing information regarding an advertised product and/or service.

In an embodiment, the processor 202 may retrieve the advertisement for insertion at one of the one or more predetermined positions in the media stream from the one or more stored advertisements in real-time. In another embodiment, the processor 202 may receive the advertisement for insertion at one of the one or more pre-determined positions in the media stream from the advertising servers 104 in real time. The processor 202 may select the advertisement for retrieval and/or real-time receiving based on the first metadata associated with the media stream. The processor 202 may compare the first metadata associated with the media stream and the third metadata associated with each of the one or more advertisements. Based on the comparison, the processor 202 may determine an advertisement appropriate for insertion at one of the one or more pre-determined positions. For example, the processor 202 may select an advertisement related to pizza delivery for insertion in a media stream for transmission to the users 110 around the dinner time. In another example, the processor 202 may select an advertisement related to sports for insertion in a media stream for display in a sports bar.

In an embodiment, the receiver 208 may receive second metadata associated with the one or more pre-determined positions from the content providers 102. The second metadata may define one or more characteristics associated with an advertisement for insertion at one of the one or more pre-determined positions in the media stream. The second metadata may comprise one or more of a type of the advertisement, a minimum duration of the advertisement, a maximum duration of the advertisement, a time to start the advertisement, a length of the advertisement, priority of advertisement positions, and/or one or more tags and/or keywords indicating context for the advertisement. In an embodiment, advertisements may not be inserted at all of the one or more pre-determined positions in the media stream. In such a case, the processor 202 may determine one or more pre-determined positions that may be left blank based on the priority of advertisement positions. The second metadata may further indicate that duration of playback of an advertisement at one of the pre-determined positions may be larger and/or shorter than duration of playback of another advertisement at another pre-determined position. The processor 202 may store the second metadata locally in the memory 204 of the content access server 106 and/or in the database 114 communicatively coupled to the content access server 106.

In an embodiment, the processor 202 may select the advertisement for insertion at one of the one or more pre-determined positions in the media stream based on the second metadata associated with the one or more pre-determined positions. The processor 202 may compare the second metadata associated with the one or more pre-determined positions and the third metadata associated with each of the one or more advertisements. Based on the comparison, the processor 202 may determine an advertisement appropriate for insertion at one of the one or more pre-determined positions. For example, if the media stream is related to a live video of a music concert, the processor 202 may insert advertisements related to music schools and/or musical instruments in the media stream.

In another embodiment, the processor 202 may select an advertisement for insertion in the media stream based on a location of the one or more pre-determined positions in the media stream. For example, when a pre-determined position for inserting the advertisement may exist towards completion of a movie featuring a particular actor, the processor 202 may select an advertisement related to another movie of the same actor.

In another embodiment, the receiver 208 may receive a log of one or more user activities performed by the users 110 from the user devices 108. The users 110 may perform the one or more activities in association with the advertisement inserted in the media stream received by the user devices 108. The users 110 may perform the one or more user activities using the user devices 108. Such one or more user activities may comprise one or more of viewing the advertisement inserted in the media stream, skipping and/or replaying the advertisement on the user devices 108, and/or responding to the advertisement. For example, when the first user 110a may not like an advertisement, the first user 110a may skip the advertisement during the playback by pressing a skip button on the input device of the user device associated with the first user 110a, such as the mobile device 108a. When the first user 110a may press the skip button, the mobile device 108a may transmit a signal to the content access server 106 to replace the advertisement with another advertisement. Similarly, when the advertisement may be of user's interest, the users 110 may replay the advertisement by pressing a replay button on the input device of the user devices 108. When the users 110 may press the replay button, the user devices 108 may transmit a signal to the content access server 106 to replay the advertisement.

In an embodiment, the processor 202 may allow the users 110 to skip and/or replay the advertisement based on the user category associated with the users 110. For example, the processor 202 may allow the users 110 of the premium user category to skip and/or replay the advertisement any number of times. In another embodiment, the processor 202 may allow the users 110 to skip and/or replay the advertisement for a fixed number of times. In another embodiment, the processor 202 may not allow the users 110 to skip and/or replay the advertisement.

In an embodiment, the processor 202 may select the advertisement for insertion at one of the one or more pre-determined positions in the media stream based on the log of the one or more user activities received from the user devices 108. For example, the processor 202 may utilize information about the advertisement skipped by the users 110. The processor 202 may not select a particular advertisement for the users 110 again when the users 110 may skip the particular advertisement. The processor 202 may not select advertisements similar to the advertisements that the users 110 always skip. For example, when the second user 110b may frequently skip advertisements related to travel services, the processor 202 may not select any travel related advertisement for the second user 110b. Similarly, when the second user 110b may repeat the advertisements related to cars, the processor 202 may select more advertisements related to cars for the second user 110b.

In an embodiment, the processor 202 may allow the users 110 to specify the type of advertisement the users 110 may want to receive. The users 110 may specify to receive humorous advertisements, fact based advertisements, advertisements related to adventurous sports, advertisements related to a particular product, advertisements related to a particular brand, and/or the like. For example, when the first user 110a may want to purchase a television, the first user 110a may specify the processor 202 to transmit advertisements related to television.

In an embodiment, the processor 202 may select the advertisement for insertion at one of the one or more pre-determined positions in the media stream based on a setting of the user devices 108. For example, when the third user 110c may set language of the television 108c as Spanish, the processor 202 may select advertisements in Spanish language for insertion in the media stream for transmission to the television 108c.

In an embodiment, the processor 202 may determine a context for the advertisement to be inserted based on the content of the media stream. The processor 202 may perform frame level analysis of a media stream to determine information about the content of the media stream. The processor 202 may use image processing techniques to determine content of a frame that may be subsequent to and/or preceding a particular pre-determined position for inserting an advertisement. The processor 202 may select the advertisement for insertion at the particular pre-determined position based on the content of the preceding and/or the subsequent frame.

Figure 3:
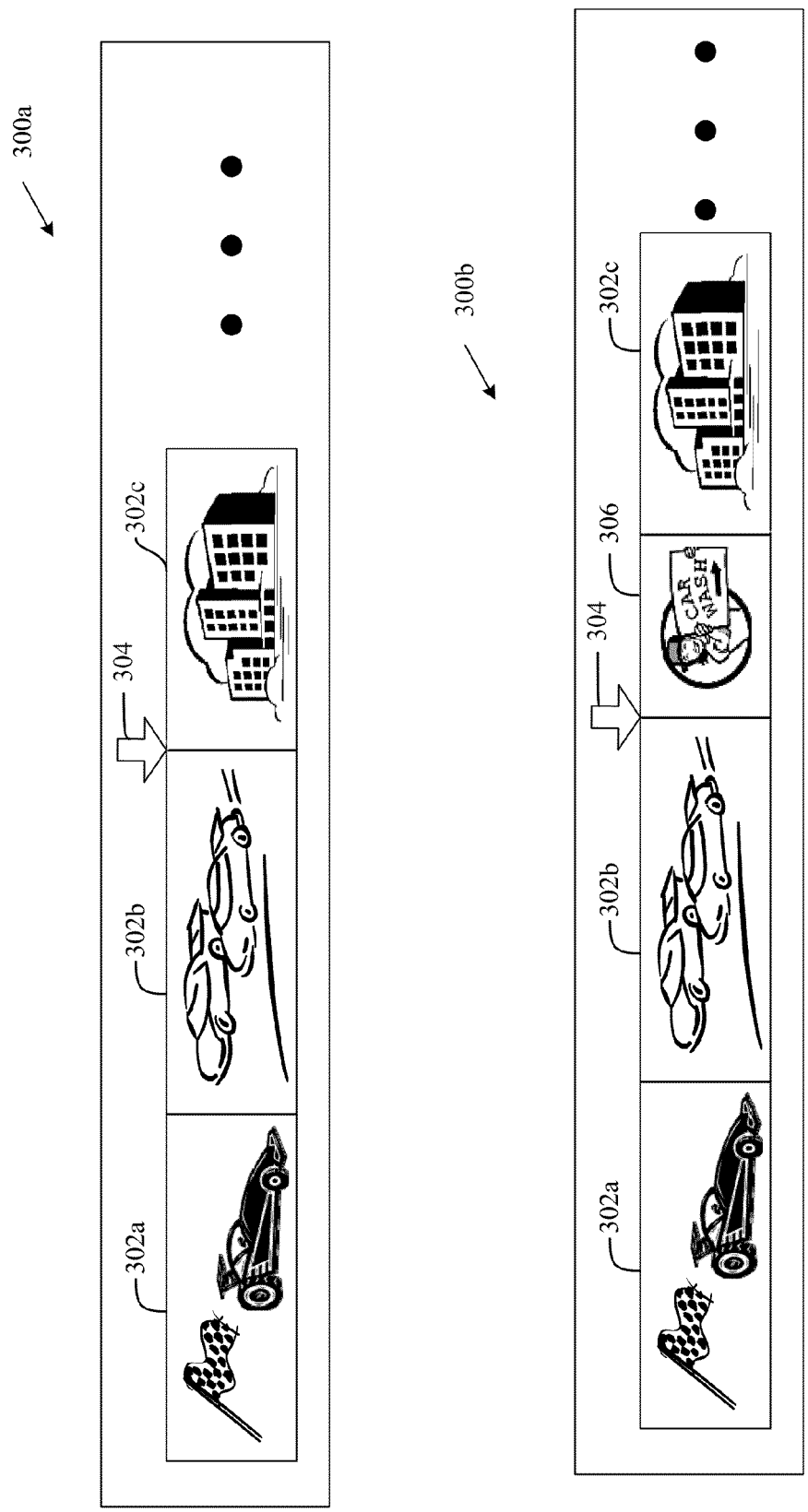
FIG. 3 is a diagram illustrating an example of inserting an advertisement in a media stream based on a content of the media stream, in accordance with an embodiment of the disclosure.

FIG. 3 is a diagram illustrating an example of inserting an advertisement in a media stream based on a content of the media stream, in accordance with an embodiment of the disclosure. The example of FIG. 3 is explained in conjunction with the block diagram FIG. 1 and FIG. 2.

Referring to FIG. 3, there is shown a media stream 300a and a media stream 300b. The media stream 300a may include a series of one or more frames, such as a first frame 302a, a second frame 302b, and a third frame 302c. The media stream 300a may further include one or more pre-determined positions for inserting an advertisement, such as a pre-determined position 304. The processor 202 may perform frame level analysis of the media stream 300a to determine information about content of frames subsequent to and/or preceding the pre-determined position 304. For example, the processor 202 may perform frame level analysis of the second frame 302b, that precedes the pre-determined position 304, to determine content of the second frame 302b. As shown in FIG. 3, the processor 202 may determine that the second frame 302b includes content related to car racing, for example. Based on the content of the second frame 302b, the processor 202 may select an advertisement related to car accessories and/or services for insertion at the pre-determined position 304.

Referring to FIG. 3, there is shown a media stream 300b having an advertisement inserted in the media stream 300b. The media stream 300b may include an advertisement 306 at the pre-determined position 304. In instances, where the second frame 302b preceding the pre-determined position 304 includes content related to car racing, for example, the advertisement 306 inserted at the pre-determined position 304 may be an advertisement for car washing. Notwithstanding, the disclosure may not be so limited and other advertisements related to cars may be inserted at the pre-determined position 304 without limiting the scope of the disclosure.

In an embodiment, the media stream may be a live broadcast of a media stream. The processor 202 may insert advertisements at one of the one or more pre-determined positions in the live broadcast of the media stream. The processor 202 may transmit the live broadcast of the media stream to the user devices 108.

In another embodiment, the processor 202 may receive a signal associated with the live broadcast of the media stream from a source of live broadcast of the media stream, such as the content providers 102. The signal may provide information such as a time to start the advertisement, a length of the advertisement, end of the advertisement, and/or one or more tags that may provide context for the advertisement. The provider of the live broadcast of the media stream may transmit the signal by embedding the signal in the live broadcast of the media stream and/or transmitting the signal via a separate channel. The processor 202 may communicate the information received from the provider of the live broadcast of the media stream to the user devices 108. Based on the communicated information, the user devices 108 may switch to the advertisement indicated by the processor 202. The provider of the live broadcast of the media stream may indicate a point in the live media stream at which the advertisement may end. At the end of the advertisement, the user devices 108 may play the live broadcast of the media stream again. For example, when the media stream may be an m3u8 stream, the processor 202 may receive a request for an index file from the user devices 108 when the user devices 108 may switch from the advertisement to the live broadcast of the media stream.

In an embodiment, the processor 202 may receive closed captions along with the live broadcast of the media stream. The closed captions may be transmitted by the source of live broadcast of the media stream along with the live broadcast of the media stream as a coded signal. The processor 202 may identify the one or more pre-determined positions for inserting an advertisement in the live broadcast of the media stream, based on the closed captions. The closed caption may provide information such as a time to start the advertisement, and/or provide context for the advertisements to be inserted. For example, closed captions associated with a live broadcast of the media stream may indicate a conversation. The processor 202 may determine the end of the conversation. The processor 202 may start an advertisement after the completion of the conversation. Additionally, the processor 202 may select an advertisement related to the topic of the conversation for insertion.

In another embodiment, the processor 202 may identify the one or more pre-determined positions for inserting an advertisement in the live broadcast of the media stream based on content of the live broadcast of the media stream. In an embodiment, the processor 202 may determine the one or more pre-determined positions in the live broadcast of the media stream in real-time. The processor 202 may insert one or more advertisements at the one or more pre-determined positions with little or no time delay between the time instant at which the one or more pre-determined positions are identified and the time instant at which the one or more advertisements are inserted. For example, during a live video of a football game the processor 202 may analyze the live video in real-time. Based on the real-time analysis, the processor 202 may determine that a team calls a time-out. The processor 202 may define the time-out as the pre-determined position for inserting the advertisement. The processor 202 may insert the advertisement as soon as the pre-determined position is identified.

Figure 4:
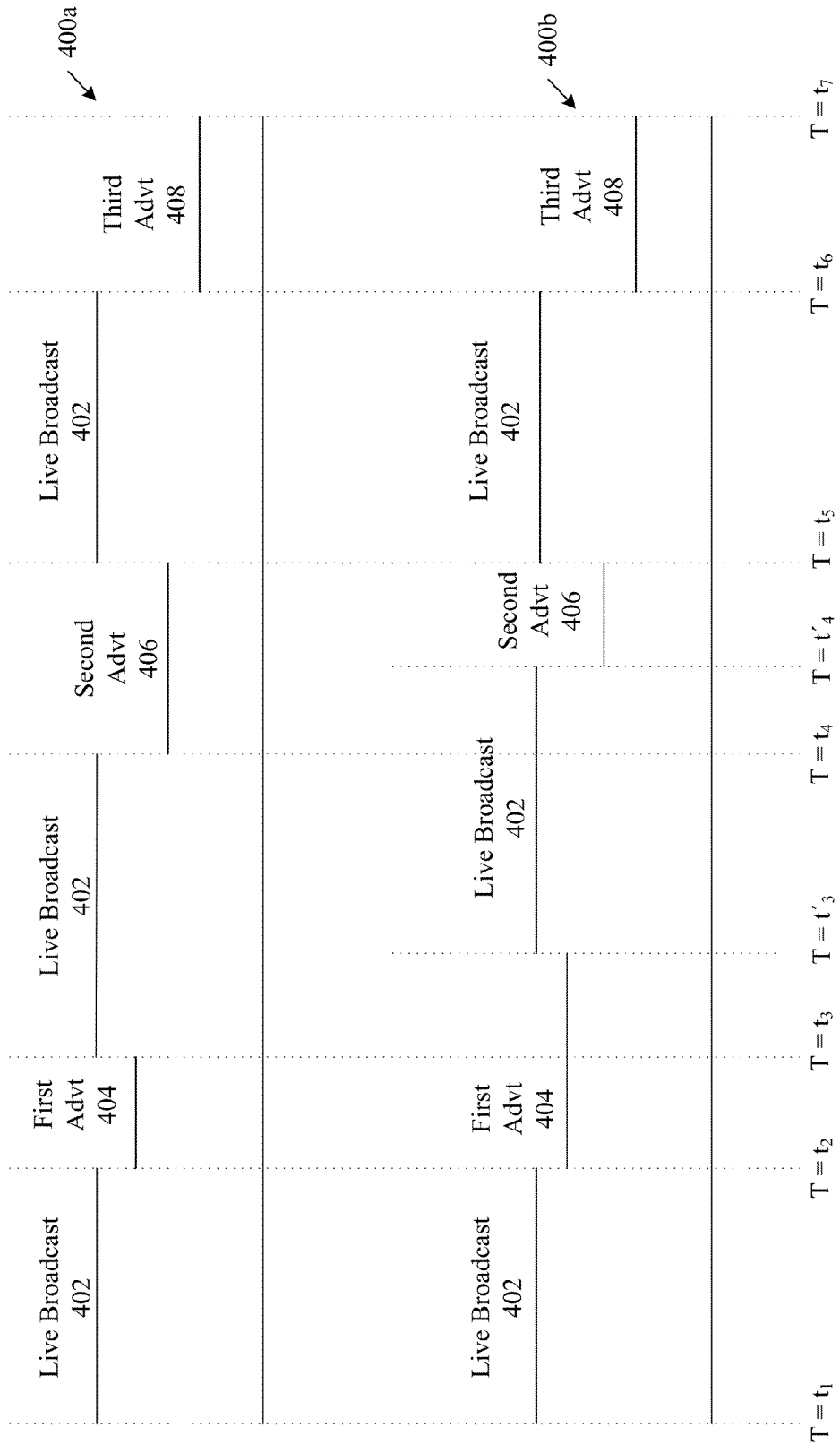
FIG. 4 is a timing diagram illustrating transmission and playback of live broadcast of a media stream and an advertisement inserted in the live broadcast of the media stream, in accordance with an embodiment of the disclosure.

FIG. 4 is a timing diagram showing transmission and playback of live broadcast of a media stream and an advertisement inserted in the live broadcast of the media stream, in accordance with an embodiment of the disclosure. The timing diagram is described in conjunction with the block diagram of FIG. 1 and FIG. 2.

Referring to FIG. 4, there is shown a timing diagram 400a and a timing diagram 400b. The timing diagram 400a and the timing diagram 400b may include a live broadcast of a media stream, hereinafter referred to as live broadcast 402, a first advertisement 404, a second advertisement 406, and a third advertisement 408. The live broadcast 402 may be a live broadcast of a football game, for example. The processor 202 may determine an advertisement for insertion in the live broadcast 402. A signal associated with the live broadcast 402 may provide information about one or more time instants for starting and/or ending the advertisement inserted in the live broadcast 402. The second advertisement 406 may be inserted in the live broadcast 402 at a position subsequent to a position of the first advertisement 404 in the live broadcast 402. Similarly, the third advertisement 408 may be inserted in the live broadcast 402 at a position subsequent to the position of the second advertisement 406 in the live broadcast 402.

The timing diagram 400a and 400b may illustrate time instants for the transmission and playback of the live broadcast 402, the first advertisement 404, the second advertisement 406, and the third advertisement 408 to the user devices 108. The timing diagram 400a may illustrate the time instants when there is no overlap between playback of the first advertisement 404 and the live broadcast 402. The timing diagram 400b may illustrate the time instants when the playback of the first advertisement 404 may overlap with the playback of the live broadcast 402.

As shown in the timing diagrams 400a and 400b, the processor 202 may transmit the live broadcast 402 to the user devices 108 between time instants $t_1$ and $t_2$. Further, the processor 202 may start transmission of the first advertisement 404 to the user devices 108 at the time instant $t_2$.

In an embodiment, as shown in the timing diagram 400a, the processor 202 may end the transmission of the first advertisement 404 at the time instant $t_3$. The user devices 108 may playback the first advertisement 404 between the time instants $t_2$ and $t_3$. At the end of the first advertisement 404, the processor 202 may restart transmitting the live broadcast 402 to the user devices 108 from the time instant $t_3$ to the time instant $t_4$. The user devices 108 may playback the live broadcast 402 between the time instants $t_3$ and $t_4$.

At the time instant $t_4$, the processor 202 may transmit the second advertisement 406 to the user devices 108. The user devices 108 may playback the second advertisement 406 between time instants $t_4$ and $t_5$. The processor 202 may restart transmitting the live broadcast 402 to the user devices 108 between time instants $t_5$ and $t_6$. At the time instant $t_6$, the processor 202 may transmit the third advertisement 408 to the user devices 108. The user devices 108 may playback the third advertisement 408 to the user devices 108 between time instants $t_6$ and $t_7$. Notwithstanding, the disclosure may not be so limited, and other time instants may be used to insert advertisements in the live broadcast 402 without limiting the scope of the disclosure.

In an embodiment, the processor 202 may delay transmission of the live broadcast 402 to the user devices 108 when playback of an advertisement inserted in the live broadcast 402 may overlap with playback of the live broadcast 402. Such overlap may occur when playback of the live broadcast 402 may start prior to completion of playback of the inserted advertisement. For example, the live broadcast of the football game may start before completion of the playback of the first advertisement 404.

As shown in the timing diagram 400b, the playback of the first advertisement 404 may extend beyond the time instant $t_3$ to a time instant $t'_3$. When the transmission of the live broadcast 402 may start at the time instant $t_3$, the playback of the first advertisement 404 may overlap with the playback of the live broadcast 402 between the time instants $t_3$ and $t'_3$. In such a case, the processor 202 may delay the transmission of the live broadcast 402 to the user devices 108 till the time instant when playback of the first advertisement 404 may be completed. For example, the processor 202 may delay the transmission of the live broadcast of the football game such that the playback of the live broadcast of the football game may start after the completion of playback of the first advertisement 404. As shown in the timing diagram 400b, the processor 202 may delay the transmission of the live broadcast 402 till the time instant $t'_3$ at which instant, the playback of the first advertisement 404 may be complete. Consequently, the processor 202 may start transmission of the live broadcast 402 at the time instant $t'_3$. The playback of the live broadcast 402 on the user devices 108 may not end at the time instant $t_4$ and may extend till time instant $t'_4$.

Based on the extended playback duration of the live broadcast 402, the processor 202 may reduce duration of the next advertisement that may be inserted in the live broadcast 402. The processor 202 may reduce the duration of the second advertisement 406 inserted in the live broadcast 402 at the position subsequent to the position of the first advertisement 404 in the live broadcast 402. As shown in the timing diagram 400b, when the playback of the live broadcast 402 may continue till the time instant $t'_4$, the processor 202 may delay the transmission of the second advertisement 406 till the time instant $t'_4$. The processor 202 may transmit the second advertisement 406 between time instants $t'_4$ and $t_5$. As a result, the duration of the playback of the second advertisement 406 may be reduced. Thereafter, the processor 202 may again transmit the live broadcast 402 to the user devices 108 between the time instants $t_5$ and $t_6$. At the time instant $t_6$, the processor 202 may transmit the third advertisement 408 to the user devices 108. The user devices 108 may playback the third advertisement 408 to the user devices 108 between the time instants $t_6$ and $t_7$.

In an embodiment, the processor 202 may receive a placeholder content, such as a logo, along with the live broadcast of the media stream received from the provider of the live broadcast media stream. When the playback of the advertisement on the user devices 108 may complete before the start of the live content, the processor 202 may transmit the logo to the user devices 108. The user devices 108 may display the logo till the time the processor 202 may transmit the live broadcast of the media stream.

In an embodiment, the processor 202 may be operable to select an advertisement for insertion at one of the one or more pre-determined positions based on one or more combinations of the above mentioned embodiments for selecting advertisements. The above mentioned embodiments for selecting advertisements and/or combinations thereof may select the advertisement for insertion in the media stream based on various factors associated with the users 110. As a result, the content access server 106 enables the advertising servers 104 to provide advertisements more relevant to the users 110.

In an embodiment, the processor 202 may not be able to select any advertisement appropriate for insertion at one of the one or more pre-determined positions. In such a case, the processor 202 may select any general advertisement from the one or more advertisements. Such a general advertisement may be related to products and/or services offered by the content access server 106.

In another embodiment, the processor 202 may adjust the position at which an advertisement may be inserted in the media stream. The processor 202 may insert an advertisement at a position near the pre-determined position. The position near the pre-determined position may be before or after the pre-determined position defined by the content providers 102. The processor 202 may adjust the position based on content of the media stream. The processor 202 may determine the content of the media stream based on one or both of frame level analysis of the media stream and/or analysis of closed captions associated with the media stream. For example, the content providers 102 may indicate that an advertisement may be inserted in a media stream at 5.00 minutes from the start of the media stream. The processor 202 may analyze the media stream to determine the content at the 5.00 minute mark of the media stream. The processor 202 may determine that the content at the 5.00 minute mark of the media stream may be a part where the playback of the media stream may not be interrupted. The processor 202 may insert the advertisement within +/−30 sec (or x seconds) of the 5.00 minute mark rather than at the 5.00 minute mark.

In an embodiment, for each advertisement inserted in the media stream, an individual and/or the organization associated with the content access server 106 may receive advertising revenue from advertisers associated with the advertising servers 104. The advertising revenue for each advertisement may be decided using various methods known in the art. In an embodiment, the content access server 106 may share the advertising revenue received from the advertisers with the content providers 102. Thus, the content access server 106 may provide an opportunity to the content providers 102 to generate advertising from the advertisements inserted in the media stream.

Figure 5:
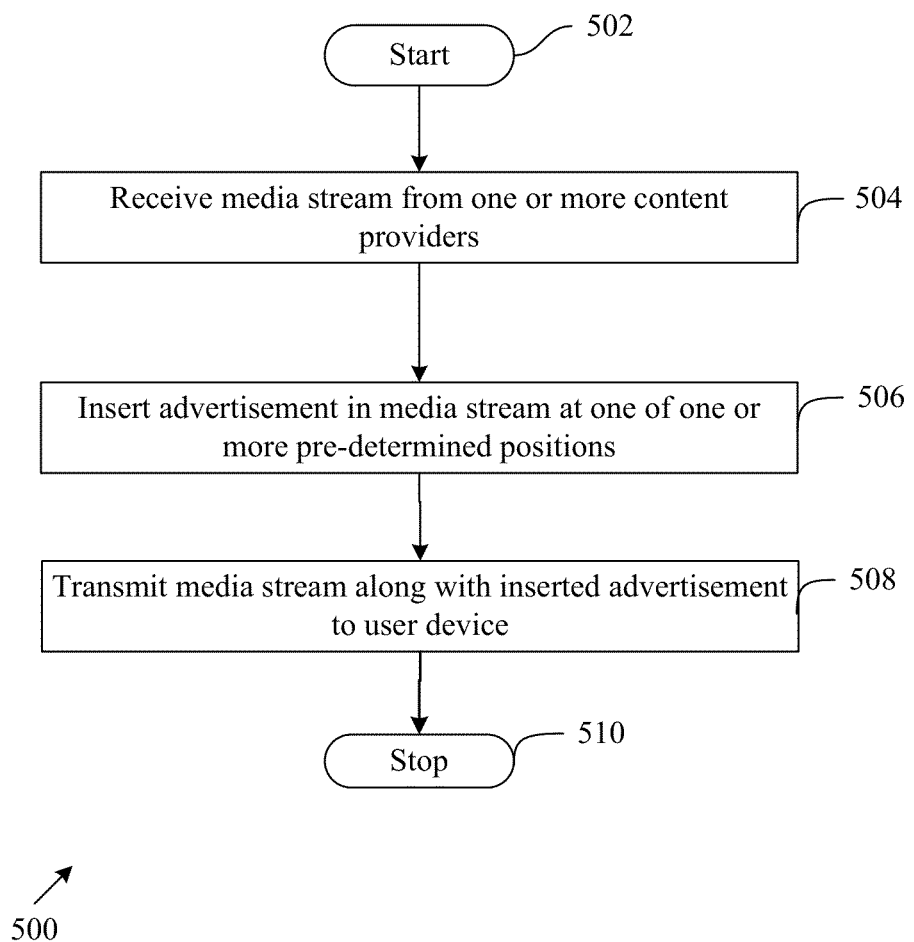
FIG. 5 is a flow chart illustrating exemplary steps for inserting an advertisement in a media stream at a content access server, in accordance with an embodiment of the disclosure.

FIG. 5 is a flow chart illustrating exemplary steps for inserting an advertisement in a media stream at a content access server, in accordance with an embodiment of the disclosure. Referring to FIG. 5, there is shown a method 500. The method 500 is described in conjunction with the block diagram of FIG. 1 and FIG. 2.

Exemplary steps begin at step 502. At step 504, via the receiver 208, the content access server 106 may receive the media stream from the one or more content providers, such as the content providers 102. The media stream may comprise one or more pre-determined positions for inserting the advertisement. At step 506, the processor 202 may insert the advertisement in the media stream at one of the one or more pre-determined positions. The processor 202 may select the advertisement for insertion based on the first metadata associated with the media stream, a location of the one or more pre-determined positions in the media stream, and one or more parameters associated with the users 110. At step 508, the transmitter 210 may transmit the media stream along with the inserted advertisement to the user devices 108. The method 500 ends at step 510.

In accordance with an embodiment of the disclosure, a method and system for inserting an advertisement in a media stream may comprise one or more processors, such as a processor 202 (FIG. 2), in a content access server 106 (FIG. 1). The one or more processors may be operable to receive the media stream from one or more content providers, such as the content providers 102 (FIG. 1). The media stream may comprise one or more pre-determined positions for inserting the advertisement. The one or more processors may be operable to select the advertisement from one or more advertisements in real-time based on a first metadata associated with the media stream, a location of the one or more pre-determined positions in the media stream, and one or more parameters associated with a user, such as the first user 110a, the second user 110b, and the third user 110c (FIG. 1). The one or more processors may be operable to insert the advertisement at one of the one or more pre-determined positions in the media stream.

The one or more processors may be operable to retrieve the advertisement from a database 114 (FIG. 1). The database 114 may store the one or more advertisements received from one or more advertising servers, such as the advertising servers 104 (FIG. 1). The one or more processors may be operable to receive second metadata associated with the one or more pre-determined positions from the one or more content providers. The advertisement may be selected based on one or more of the second metadata and/or one or more user activities associated with the advertisement.

Other embodiments of the disclosure may provide a non-transitory computer readable medium and/or storage medium, and/or a non-transitory machine readable medium and/or storage medium, having stored thereon, a machine code and/or a computer program having at least one code section for inserting an advertisement in a media stream, the at least one code section being executable by a machine and/or a computer, thereby causing the machine and/or computer to perform the step comprising, in a content access server. The step may comprise receiving the media stream from one or more content providers. The media stream may comprise one or more pre-determined positions for inserting the advertisement. The step may comprise retrieving the advertisement from a database storing one or more advertisements. The advertisement may be retrieved in real-time based on a first metadata associated with the media stream, a location of the one or more pre-determined positions in the media stream, and one or more parameters associated with a user. The step may comprise inserting the advertisement in the media stream at one of the one or more pre-determined positions.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for inserting an advertisement in a media stream, said method comprising:
in a content access server:
receiving said media stream from one or more content providers, wherein said media stream comprises one or more pre-determined positions for inserting said advertisement;
inserting said advertisement in said media stream at one of said one or more pre-determined positions, wherein said advertisement is selected from one or more advertisements in real-time based on a first metadata associated with said media stream, a location of said one or more pre-determined positions in said media stream, and one or more parameters associated with a user;
delaying transmission of a live broadcast of said media stream when playback of said live broadcast of said media stream starts prior to completion of playback of a first advertisement; and
reducing duration of playback of a second advertisement when said playback of said live broadcast of said media stream starts prior to completion of said playback of said first advertisement, wherein a position of said second advertisement in said live broadcast of said media stream is subsequent to a position of said first advertisement in said live broadcast of said media stream.

2. The method of claim 1, wherein said one or more pre-determined positions in said media stream are defined by said one or more content providers.

3. The method of claim 1, wherein said one or more pre-determined positions in said media stream are defined by a third party server.

4. The method of claim 1, further comprising receiving said one or more advertisements from one or more advertising servers.

5. The method of claim 1, further comprising receiving second metadata associated with said one or more pre-determined positions from said one or more content providers.

6. The method of claim 5, wherein said second metadata comprises one or more of: a type of said advertisement, a minimum duration of said advertisement, a maximum duration of said advertisement, a time to start said advertisement, a length of said advertisement, and/or one or more tags and/or keywords indicating context for said advertisement.

7. The method of claim 5, further comprising selecting said advertisement from said one or more advertisements in real-time based on said second metadata.

8. The method of claim 1, further comprising receiving from a user device associated with said user, a log of one or more user activities associated with said advertisement.

9. The method of claim 8, wherein said one or more user activities comprises one or more of: viewing said advertisement, skipping said advertisement, responding to said advertisement, and/or replaying said advertisement.

10. The method of claim 8, further comprising selecting said advertisement from said one or more advertisements in real-time based on said one or more user activities.

11. The method of claim 1, wherein said one or more parameters comprise one or more of: a user's profile, a type of content of media stream played by said user, a user's location, a user's subscription details, a user's billing information, one or more products purchased by said user, a time spent by said user on playing said media stream, one or more settings of said user device, one or more user preferences, time at which said user plays said media stream, information associated with another user device associated with said user, a user category associated with said user, and/or said user's demographic profile.

12. The method of claim 1, wherein said first metadata comprises one or more of: viewership of said media stream, time of transmission of said media stream, duration of said media stream, a location where said media stream is played, and/or information related to content of said media stream.

13. The method of claim 1, further comprising storing at said content access server, one or both of: at least a portion of said received media stream and/or said received one or more advertisements.

14. A system for inserting an advertisement in a media stream, said system comprising:
one or more processors in a content access server, said one or more processors being operable to:
receive said media stream from one or more content providers, wherein said media stream comprises one or more pre-determined positions for inserting said advertisement;
select said advertisement from one or more advertisements in real-time based on a first metadata associated with said media stream, a location of said one or more pre-determined positions in said media stream, and one or more parameters associated with a user;
insert said selected advertisement at one of said one or more pre-determined positions in said media stream;
delay transmission of a live broadcast of said media stream when playback of said live broadcast of said media stream starts prior to completion of playback of a first advertisement; and
reduce a duration of playback of a second advertisement when said playback of said live broadcast of said media stream starts prior to completion of said playback of said first advertisement, wherein a position of said second advertisement in said live broadcast of said media stream is subsequent to a position of said first advertisement in said live broadcast of said media stream.

15. The system of claim 14, wherein said one or more processors are operable to retrieve said advertisement from a database, wherein said database stores said one or more advertisements received from one or more advertising servers.

16. The system of claim 14, wherein said one or more processors are operable to receive second metadata associated with said one or more pre-determined positions from said one or more content providers.

17. The system of claim 14, wherein said one or more processors are operable to select said advertisement based on one or both of: said second metadata and/or one or more user activities associated with said advertisement.

* * * * *